A. H. HOCK.
DISH WASHER.
APPLICATION FILED AUG. 15, 1919.
1,388,431.
Patented Aug. 23, 1921.
2 SHEETS—SHEET 1.
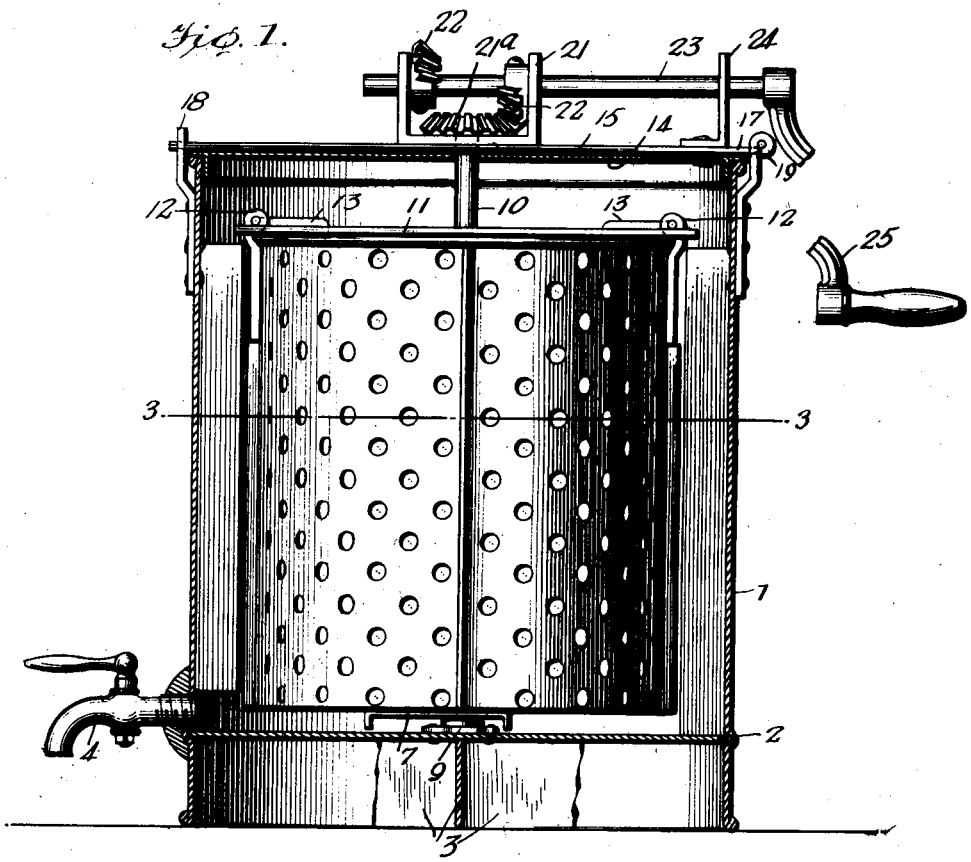
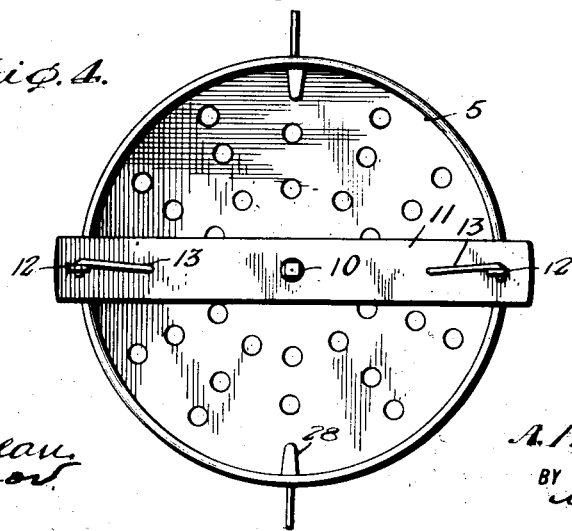
WITNESSES
INVENTOR
A. H. Hock,
BY
ATTORNEYS A. H. HOCK.
DISH WASHER.
APPLICATION FILED AUG. 15, 1919.
1,388,431.
Patented Aug. 23, 1921.
2 SHEETS—SHEET 2.
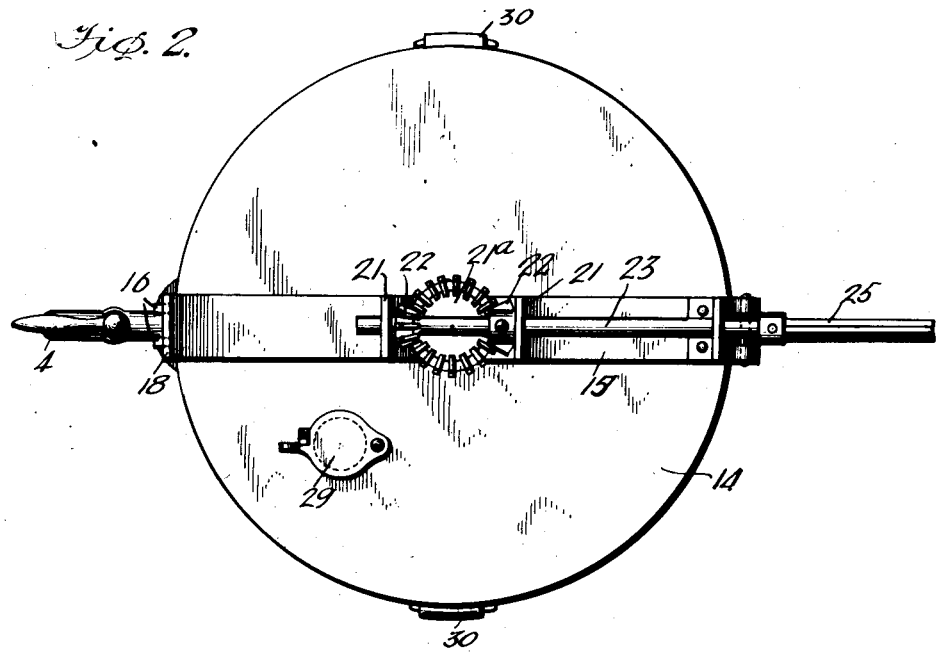
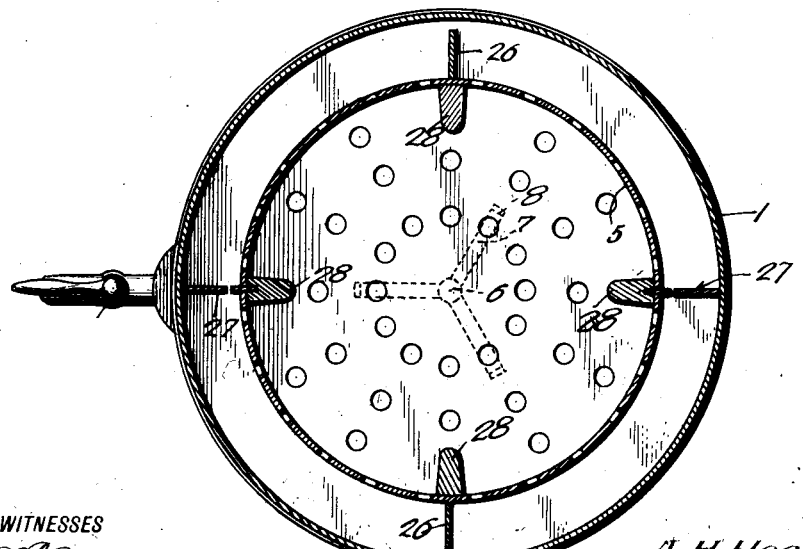

UNITED STATES PATENT OFFICE.

ALFRED H. HOCK, OF BLUEFIELD, WEST VIRGINIA.

DISH-WASHER.

1,388,431. Specification of Letters Patent. Patented Aug. 23, 1921.

Application filed August 15, 1919. Serial No. 317,756.

*To all whom it may concern:*

Be it known that I, ALFRED H. HOCK, a citizen of the United States, and a resident of Bluefield, in the county of Mercer and State of West Virginia, have invented certain new and useful Improvements in Dish-Washers, of which the following is a specification.

My invention is an improvement in dish washers, and has for its object to provide a device of the character specified, especially adapted for family use, wherein a container is provided for the water, and a second perforate container for the dishes mounted to rotate within the first named container, and having means for rapidly oscillating the same, with means in connection with the two containers for forcibly driving the water through the perforate walls of the inner container, and wherein means is provided for limiting the relative movement of the dishes with respect to the oscillating container.

In the drawings:

Figure 1 is a vertical section of the dish washer,

Fig. 2 is a plan view,

Fig. 3 is a longitudinal section,

Fig. 4 is a top plan view of the inner container.

In the present embodiment of the invention a container 1 is provided for the water, and for holding the container for the dishes to be washed, the said container 1 being a cylindrical sheet metal casing, and having a bottom 2 spaced above the lower end of the body of the casing as shown. Cross bars 3 are arranged diametrically of the body below the bottom and at right angles to each other, to brace the bottom and the body to prevent sagging of the bottom under the weight of the dishes. The body also has a drain spigot 4, at the bottom for draining off the water after it has been used.

The inner or dish container 5 is a cylindrical casing of perforate material, being in the present instance of sheet metal which is provided with the perforations, and these perforations are preferably in the bottom as well as in the side wall.

A journal pin 6 is secured to the bottom of the casing 5, the said pin 6 having three radial extensions 7 which are secured to the bottom of the container, and each extension has a depending leg 8, the said legs being spaced apart at equal distances from each other and from the journal pin.

This journal pin is adapted to engage a step-bearing 9 on the bottom 2 of the container 1, and a second journal pin 10 is connected with a cross plate 11, which is adapted to be connected with the top of the container 5. This cross plate has slots at its ends for receiving staples 12 on the container 5, and the plate also has hooks 13 for engaging the openings of the staples, to prevent displacement of the plate. The hooks as shown are pivoted to the plate, so that they may be swung into and out of engaging position.

A cover 14 is provided for the container 1, the said cover having a flange fitting into the casing 1, and the cover is locked in place on the container by a cross plate 15. This cross plate has at one end a pair of lugs 16 and at the other a single lug 17 for engaging keepers 18 and 19 secured to the body, and extending above the cover, and it will be evident that when the cross plate is engaged with the keepers, it will be securely locked in place as will also the cover. The journal pin 10 passes through registering openings in the cover and in the cross plate 15, and the pin has a polygonal portion at its upper end, which is adapted to engage within the similarly shaped hub of a beveled gear wheel 21ª. This gear wheel is journaled on the body of a substantially U-shaped bracket 21 which is secured to the cross plate 15, and it is engaged by mutilated gears 22 on a shaft 23 journaled in the arm of the bracket 21, and in a bracket 24 secured to the cross plate.

A crank 25 is connected with the outer end of the shaft 24 for rotating the same, and it will be evident that when the shaft 23 is turned by the crank, the mutilated gears will alternately engage the gear wheel 20 and will turn the same in opposite directions. Each mutilated gear has teeth extending over a little less than half its circumference, so that one will always be disengaged before the other is engaged.

In order to drive the water through the perforate walls of the container 5 and through the dishes in the container, the said container 5 is provided with radial vanes or blades 26 at its outer surface, two blades being provided in the present instance, the said blades extending in opposite directions. The blades extend from the top to the bottom of the container, and it will be evident that when the container is oscillated the blades will drive the water in opposite directions.

A pair of blades or vanes 27 is arranged on the inner face of the wall of the container 1, the said blades being at opposite sides of the container, and the aggregate width of the blades 26 and 27 is such that they will move just out of contact with the walls of the container 1 and 5 respectively. When a blade 26 approaches a blade 27, the water between the blades is first moved rapidly and strongly through the perforate walls of the container 5, since it cannot escape in any other direction so easily, thus forcing powerful streams of water on the dishes and thoroughly cleansing them. Since the container 5 is oscillated in the container 1, it will be evident that the water will be forced through and through the container 5, thus touching every part of the dishes held therein.

In order to limit the movement of the dishes with respect to the container 5, holding fins or blades 28 are provided, the said blades extending radially inward from the wall of the container 5 at suitable intervals, in the present instance at intervals of 90°. These blades or fins 28 are of wood as shown, preferably of maple, and they are rounded at their corners so that they will not chip the dishes. The legs 8 hold the container 5 approximately upright when the cover 14 is removed. When the cover is in place, these legs do not contact with the bottom.

Referring to Fig. 2 it will be seen that the lugs 19 are two in number, spaced apart from each other, and that the lug 17 of the cross plate is hinged to these lugs 19. The pintle pin however is detachable, in order that the cross plate may be removed.

In operation the container 5 is placed within the container 1 with the journal pin 6 in the bearing 9. The dishes are now placed within the container 5, after which the cross plate 11 is placed and secured to the container 5. Water may now be inserted in the container, after which the cover 14 and the cross plate 15 are placed. The cover 14 has an opening in its top covered by a sliding panel 29 into which water may be inserted without removing the cover, and the container 1 has handles 30 for convenience in handling the same.

I claim:

A device of the character described, comprising a stationary cylindrical outer container, a rotatably mounted inner container having its bottom spaced appreciably above the bottom of the outer container, the inner container being perforated throughout, a plurality of vertical strips extending inwardly from the inner periphery of the outer container, a plurality of vertical ribs extending inwardly from the inner periphery of the inner container, and a plurality of outwardly extending strips carried by the inner container, some of said strips having their inner edges embedded within certain of said ribs.

ALFRED H. HOCK.